United States Patent [19]
Seitz

[11] Patent Number: 6,149,032
[45] Date of Patent: Nov. 21, 2000

[54] ELECTRO-MECHANICAL PISTON METER

[75] Inventor: Gary L. Seitz, Decatur, Ind.

[73] Assignee: Tokheim Corporation, Fort Wayne, Ind.

[21] Appl. No.: 09/293,410

[22] Filed: Apr. 16, 1999

[51] Int. Cl.[7] ...................................................... B65B 1/04
[52] U.S. Cl. .................... 222/25; 222/23; 222/38
[58] Field of Search ........................... 222/71, 23, 25–28, 222/38, 57, 72, 73; 73/861.08, 861.11, 861.12, 861.15

[56] References Cited

U.S. PATENT DOCUMENTS

| | | |
|---|---|---|
| 2,736,466 | 2/1956 | Rodth . |
| 4,122,378 | 10/1978 | Brown . |
| 4,150,925 | 4/1979 | Perkins . |
| 4,599,052 | 7/1986 | Langen et al. . |
| 4,779,761 | 10/1988 | Rudick et al. . |
| 4,994,984 | 2/1991 | Massimo ................................. 364/510 |
| 5,121,855 | 6/1992 | Credle, Jr. . |
| 5,125,533 | 6/1992 | Gayer et al. . |
| 5,244,118 | 9/1993 | Fallon et al. ................................. 222/3 |

*Primary Examiner*—Steven O. Douglas
*Attorney, Agent, or Firm*—Randall J. Knuth

[57] ABSTRACT

An electromechanical piston meter for volumetrically measuring the quantity of fluid displaced. In one particular embodiment, inlet and outlet valving permits the electromechanical piston meter to vary the flow of fluid through the piston meter. When the electromechanical piston meter with inlet and outlet valving is disposed within a fuel dispenser, infinently variable blending is achieved without a separate meter and blend valve.

9 Claims, 6 Drawing Sheets

ELECTRO-MECHANICAL PISTON METER

BACKGROUND OF THE INVENTION

1. Field of the Invention

The present invention relates to a fuel dispenser meter, and in particular, an electromechanical piston meter for volumetrically measuring dispensed fluids.

2. Description of the Related Art

Many modern fuel dispensers volumetrically measure and dispense a variety of fuel products. These fuel products may include various octane fuels.

Some fuel dispensers dispense fuel products with varying octane ratings from high to low. Traditionally, high and low octane products are supplied to the fuel dispenser through high and low octane supply lines.

Some fuel dispensers provide for variable blending of fuel products by controlling the flow rate of the various fuel products. Blended fuel product is dispensed by combining the various fuel products using a "Y" or other type connector for joining the various supply inlets to a single outlet. By varying the flow rates of the various fuel products supplied, variably blended fuel product can be dispensed.

Traditionally, a separate meter is associated with each fuel supply line for volumetrically measuring the amount of fuel supplied through the respective fuel supply line. In addition, a blend valve is normally disposed between the respective fuel supply and the junction of the fuel supply lines. Variable blending is achieved by metering the respective fuel supply volumes and adjusting the blend valve to accurately supply the desired quantity of fuel to the junction of fuel supply lines.

One problem in the art is that a separate meter and blend valve must be located in-line for each fuel product supplied to a fuel dispenser in order to vary the octane rating of the fuel product dispensed. To control the flow rate, a meter volumetrically measures the quantity of fluid supplied and a separate blend valve is adjusted, as necessary, to effectuate the desired flow rate. The necessity of two separate components, a meter and a blend valve, results in an increased cost of both manufacturing and assembly due to the necessity of these two components.

What is needed in the art is a single component which both volumetrically measures the quantity of fuel supplied through a fuel supply line and controls the flow rate through that fuel supply line whereby permitting accurate and variable flow rate without the need of a separate meter and blend valve component.

SUMMARY OF THE INVENTION

The present invention is a piston meter which volumetrically measures the quantity of a fluid product. The volume is computed as a function of a piston reciprocation within a cylinder. In one particular embodiment, the piston meter contains inlet and outlet valves for varying the flow of fluid through the piston meter.

The invention, in one embodiment thereof, is a piston meter. The piston meter includes a cylinder having an inlet and an outlet. A piston reciprocates within the cylinder. A piston sensor detects one of location and placement of the piston within the cylinder. Volume computational means returns a volume signal as a function of the piston reciprocation within the cylinder. In a further embodiment, an inlet valve is operatively associated with the inlet and an outlet valve is operatively associated with the outlet. Control means is operatively connected to the inlet and outlet valves.

The invention, in another embodiment, thereof is a dispenser for supplying blended fluid. The dispenser includes at least one fluid supply line and a piston meter. The piston meter comprises a cylinder having an inlet and an outlet. The inlet is in fluid communication with the fluid supply line. A piston is reciprocatable within the cylinder and a piston sensor detects one of location and placement of the piston within the cylinder. Volumetric computational means returns a volume signal as a function of the piston reciprocation within the cylinder. In a further embodiment, an inlet valve is in fluid communication with the inlet and an outlet valve is in fluid communication with the outlet. A control means is operatively connected to the inlet and outlet valves.

The invention, in yet another embodiment thereof, is a method of volumetrically metering fluid to be dispensed. The method includes supplying fluid to a piston meter having a reciprocatable piston within a cylinder. The location of the piston within the cylinder is determined. The volume of fuel supplied is calculated as a function of the piston reciprocation. In a further embodiment, the location or the piston is determined using an electronic sensor to detect piston movement and displacement.

One advantage of the present invention is a piston meter which volumetrically measures the volume of fluid supplied as a function of the piston reciprocation within a cylinder. Through the use of a piston sensor which detects the location or placement of the piston within a cylinder and determining the total distance the piston reciprocates within the cylinder, the piston meter is able to accurately measure the volume of fluid supplied through the meter. While piston meters have been used in the art of fluid dispensing to supply a set or pre-determined volume (e.g., volume equal to the cylinder volume), the art fails to include a meter which actually computes a total volume of fluid supplied. In other words, the art teaches the use of a piston meter to give a relative volume of fluid supplied but not a total volume.

Another advantage of the present invention is a unified piston meter and valve system of one embodiment. By having a single piston meter and blend valve system, one is able to manufacture and assemble a dispenser faster and less expensive as compared with a dispenser having separate meter and blend value. Therefore, there is a cost savings due to the efficiency of using a single unified piston meter and valve system rather than separate meter and blend valve components.

Yet another advantage of one particular embodiment of the present invention is a unified piston meter and valve system which permits control of flow rate to provide infinitely variable blending of fluid products without a blend valve.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
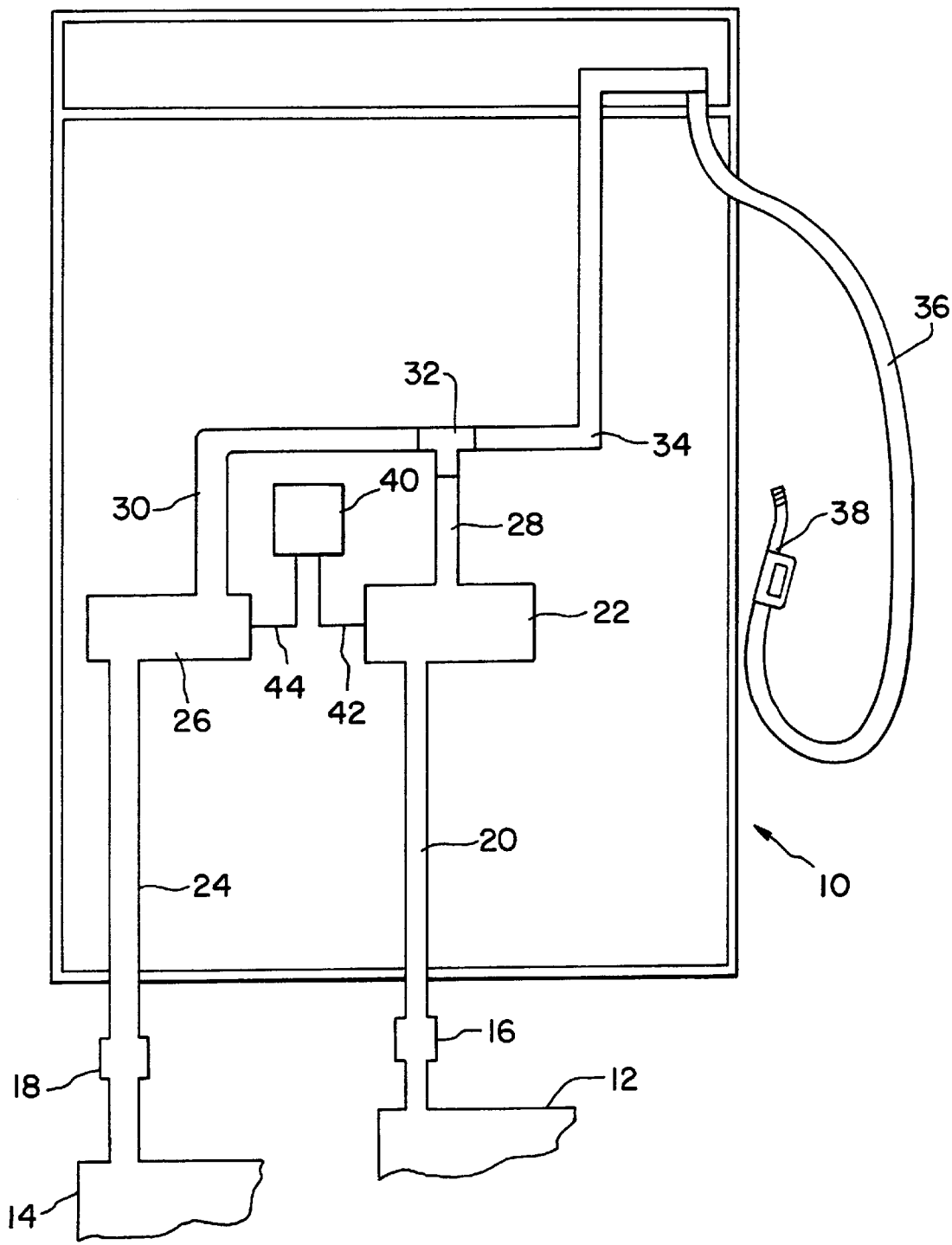
FIG. 1 is a sectional, diagrammatical view of a fuel dispenser incorporating the present invention.

Referring now to the drawings and particularly to FIG. 1, there is shown fuel dispenser 10 incorporating the present invention. Fuel dispenser 10 includes high octane fuel supply 12 and low octane fuel supply 14. High octane fuel pump 16 and low octane fuel pump 18 are in fluid communication with the fuel supplies 12, 14, respectively.

Fuel pump 16, when activated, pumps high octane fuel from high octane fuel supply 12 through high octane supply conduit 20 to high octane piston meter 22. Low octane fuel pump 18, when activated, pumps low octane fuel from low octane supply 14 through low octane supply conduit 24 to low octane piston meter 26. High and low octane fuel exit piston meter 22, 26 through high octane outlet conduit 28 and low octane outlet conduit 30, respectively.

High and low octane outlet conduit, 28, 30 meet at junction conduit 32. Junction conduit 32 merges high octane and low octane fuel together to produce blended fuel.

Blended fuel conduit 34 joins junction conduit 32 with fuel hose 36. Fuel hose 36, in turn, is connected to nozzle 38. Blended fuel is dispensed through nozzle 38 to a vehicle during re-fueling.

Controller 40 is connected to high and low octane piston meters 22, 26 by lines 42, 44, respectively. Controller 40 computes the volume of high and low octane fuel supplied to junction conduit 32. In addition, controller 40 varies the flow of high and low octane fuel supplied to junction conduit 32 by controlling the flow rate of fuel through piston meters 22, 26.

Figure 2A:
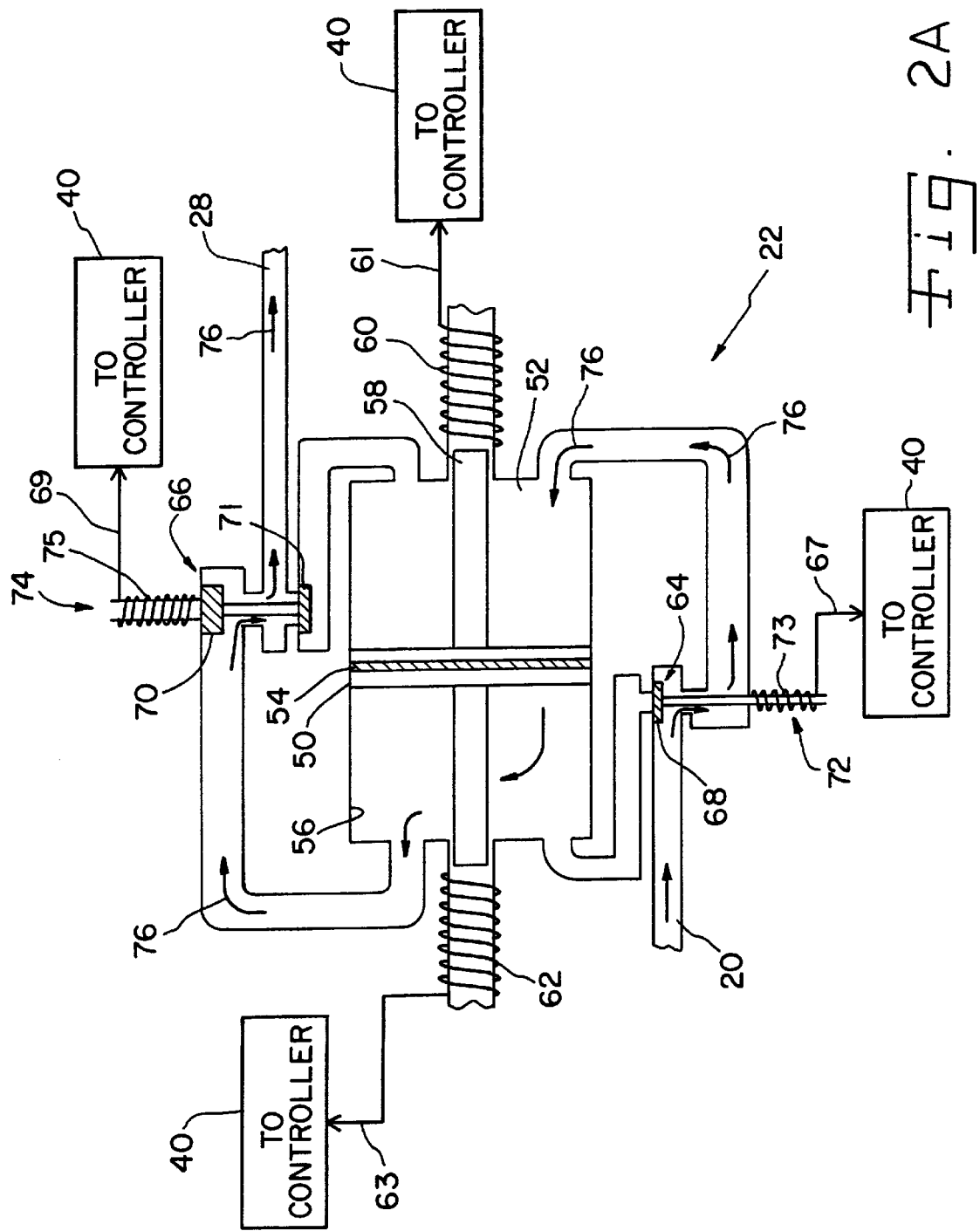
FIG. 2a is a cross-sectional view of an electromechanical piston meter of the present invention in configuration A.
Figure 2B:
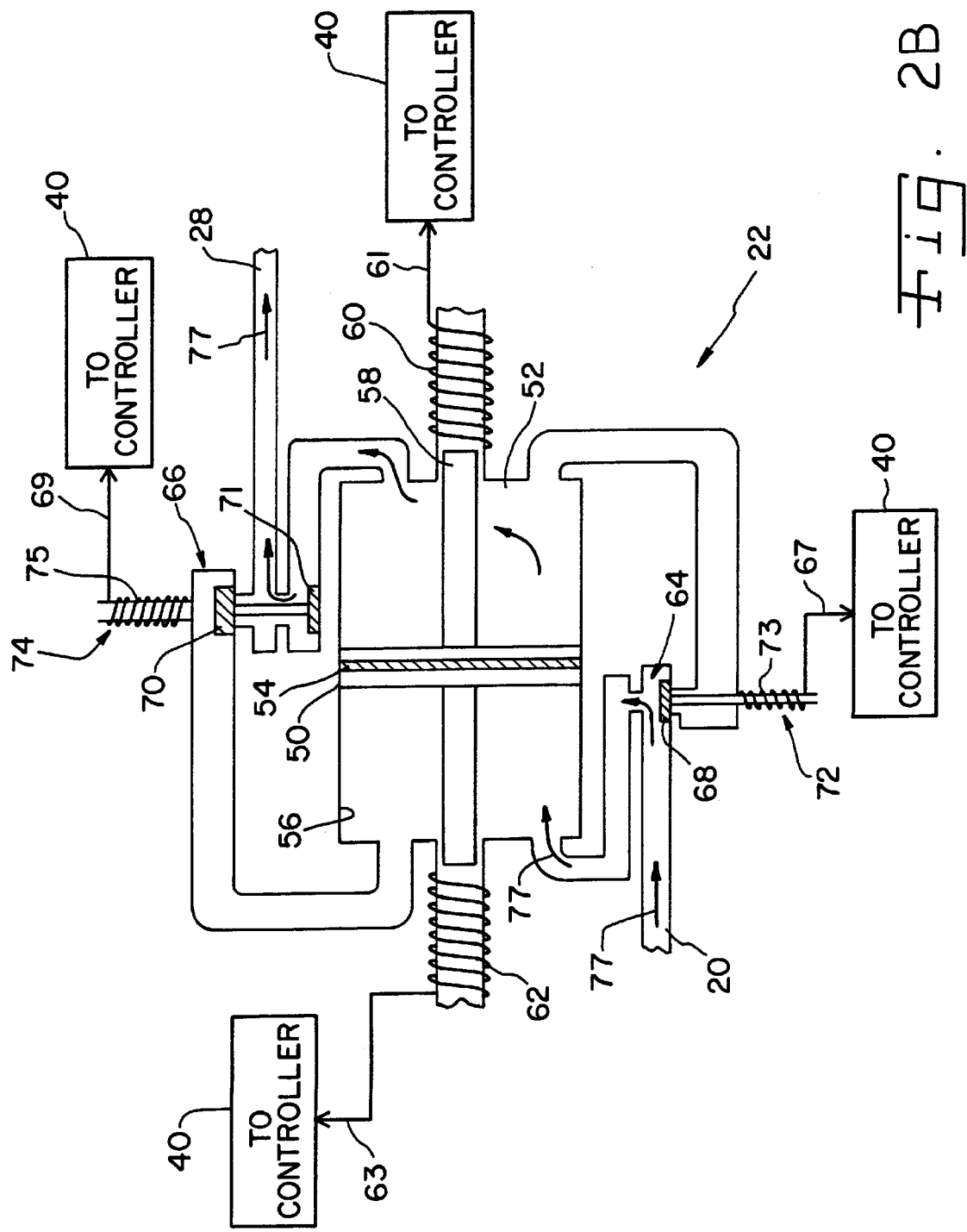
FIG. 2b is a cross-sectional view of an electromechanical piston meter of the present invention in configuration B.

Now referring to FIG. 2a and FIG. 2b, there is shown high octane piston meter 22. Low octane piston meter 26 (FIG. 1) is similar in design and function to high octane piston meter 22.

Piston meter 22 is composed of piston 50, which reciprocates within a cylinder 52. Seal 54, located about piston 50, provides a fluid tight arrangement between piston 50 and cylinder wall 56 for preventing fuel from escaping between piston 50 and cylinder wall 56.

Iron core 58 proceeds axially through piston 50 and reciprocates with piston 50. Wire coils 60, 62 are located at opposite ends of piston meter 22. An electric current is applied to wire coils 60, 62.

Iron core 58 enhances the magnetic field of the coils 60, 62 such that when iron core 58 moves through wire coils 60, 62, the current is affected in wire coils 60, 62. In addition, the inductance of the wire coils 60, 62 and iron core 58 system is varied as iron core 58 moves through wire coils 60, 62. The varied inductance is due to a change in inductive properties of the wire coils 60, 62 and iron rod 58 system.

An example of a varied inductive property is inductive reactance. Inductive reactance is the resistance to a current created by the building up of a magnetic field in a coil or similar device. The magnetic field tends to resist a change of state. Reactance is the total resistivity of a system, both DC resistance and frequency related resistance.

The varying resistance is a direct consequence of iron core 58 proceeding through wire coils 60, 62. In this system, inductance equates to resistance, such that a change in inductance is realized through a change in resistance of the system. The reactance changes as the iron core 58 traverses the wire coils 60, 62.

The detected change in inductance and current flow through wire coils 60, 62 is relayed to controller 40 by lines 61, 63, respectively. Through the detected varying inductance and current flow, controller 40 determines the placement and movement of piston 50.

The volume of fluid displaced by piston meter 22 is calculated as a function of piston 50 reciprocation within cylinder 52. The detected varying inductance and current flow allows controller 40 to determine the location of piston 50 within cylinder 52. Controller 40 calculates the volume of fluid displaced by the detection of the movement of piston 50 within cylinder 52 over time. By knowing the total distance over which piston 50 traverses as piston 50 reciprocates within cylinder 52 and the volume piston 50 displaces as piston 50 reciprocates, a total volume of fluid displaced from piston meter 22 is determined.

Controller 40 varies the flow rate of fluid through piston meter 22. Controller 40 operates inlet valve 64 and outlet valve 66. Valves 64, 66 operates under solenoid 72, 74 control. Valve 64 contains plunger 68 and valve 66 contains plunger 70. Solenoid wire winding 73, 75 are connected to controller 40 by lines 67, 69, respectively. Depicted in FIG. 2a, plungers 68, 70, are in "A" position. Controller 40, through the use of solenoid windings 72, 74, controls valves 64, 66 by movement of plungers 68, 70 from an "A" position (FIG. 2a) to a "B" or lower position (FIG. 2b).

Solenoids 72, 74 control inlet valve 64, and outlet valve 66, respectively, through the movement of inlet plunger 68 and outlet plungers 70, respectively. Controller 40 sends a signal to solenoids 72, 74 through lines 67, 69, respectively, which controls the movement of inlet plunger 68 and outlet plungers 70, respectively. When plungers 68, 70 are in their A position (FIG. 2a), fuel flows through piston meter 22 from supply conduit 20 through cylinder 52 and out outlet conduit 28 as indicated by arrows 76. When inlet plunger 68 and outlet plunger 70 are in their B position (depicted in FIG. 2b), the flow of fuel through piston meter 22 is indicated by arrows 77.

Controller 40 can vary the flow of fuel through piston meter 22 by opening and closing inlet valve 64 and outlet valve 66. For example, controller 40 can control the rate at which valves 64 and 66 are operated, thus controlling the volume of fluid over time (the rate at which fuel is being dispensed). At no time will valves 64 and 66 be partially or completely open at the same instance (relative to the same side of the piston). By independently varying the positions of inlet plunger 68 and outlet plungers 70, 71, an infinitely variable flow rate of fuel through piston meter 22 may be achieved.

FIGS. 2a and 2b depict piston meter 22 using wire coils 60, 62 as an indicator of varying inductance and current as piston 50 reciprocates within cylinder 52. Alternatively, controller 40 can use other electronic sensing means, such as magnetic or optic to detect the placement of piston 50 within cylinder 52.

Figure 3:
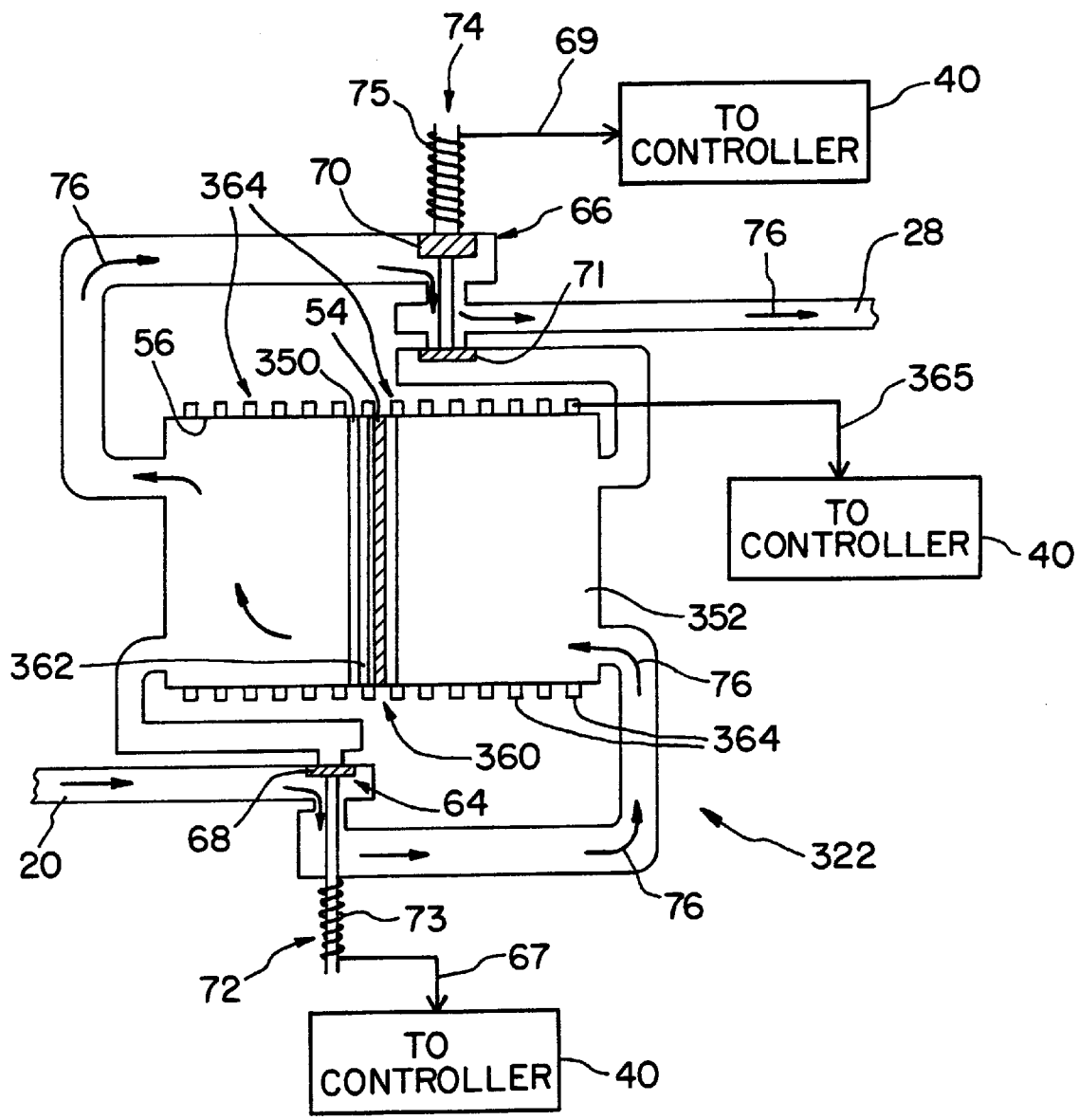
FIG. 3 is a cross-sectional view of an electromechanical piston meter of the present invention utilizing a magnetic sensor to detect piston movement and location.

Referring now to FIG. 3, in an alternate embodiment, the fuel dispenser may contain piston meter 322. Piston meter 322 uses a magnetic sensor system 360 for detecting movement and location of piston 350. Piston 350 contains a magnet 362. A plurality of magnetic sensors 364 disposed along cylinder 352. When piston 350, with magnet 362, passes one of the plurality of magnetic sensors 364, the magnetic sensors 364 detects the passing of piston 350. The plurality of magnetic sensor 364 is in communication with the controller 40 by line 365, whereby controller 40 detects the movement and location of piston 350 within cylinder 352.

Figure 4:
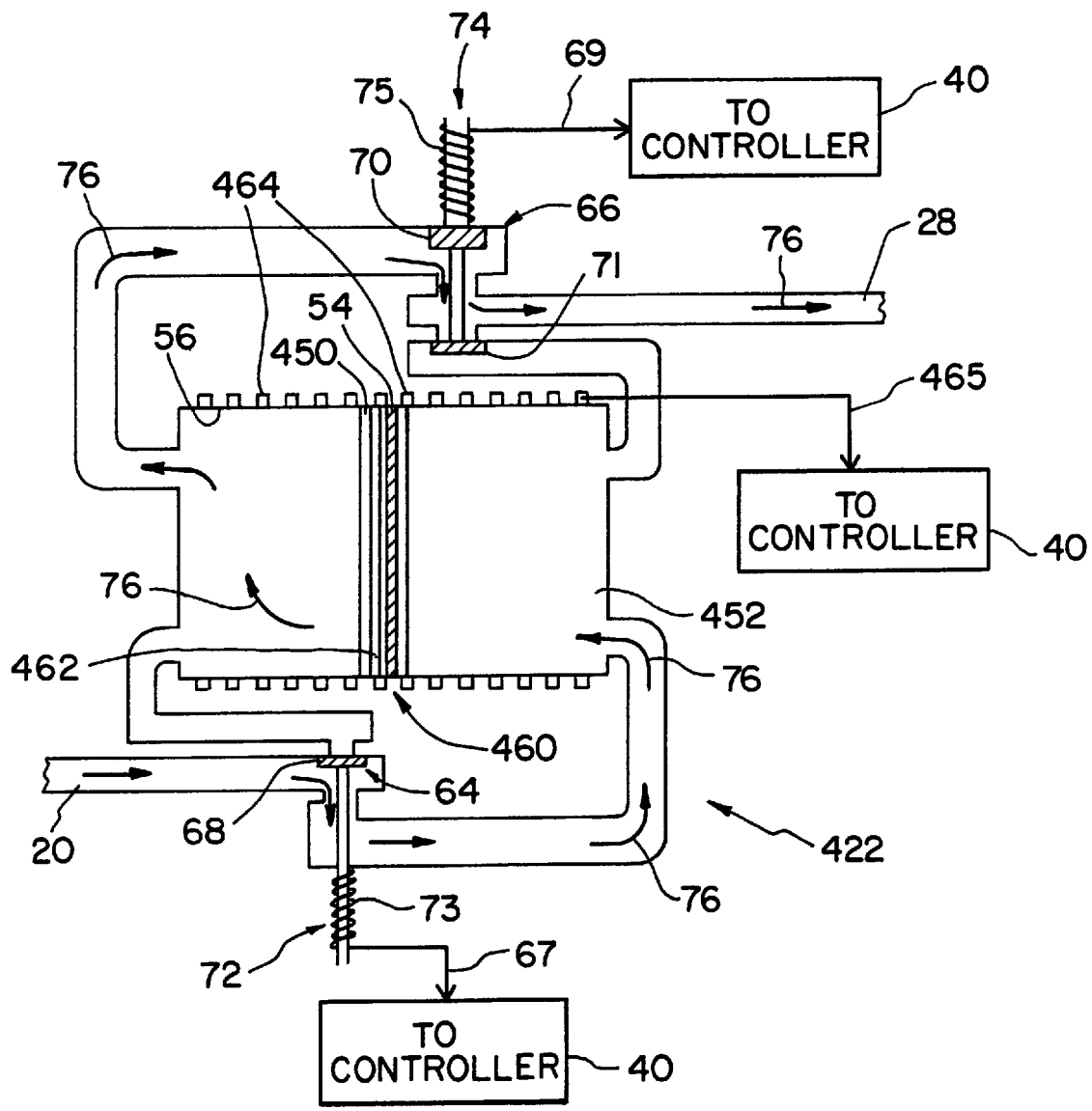
FIG. 4 is a cross-sectional view of an electromechanical piston meter of the present invention utilizing a optical sensor to detect piston movement and location.

Alternatively, the piston meter may utilize an optical sensor system for detecting the placement of the piston within the cylinder in which it reciprocates. Referring now to FIG. 4, optical sensor system 460 comprises optical emitting means 462 attached to piston 450 and a series of optical detecting means 464 disposed about cylinder 452. The optical detecting means 464 is in operative communication with controller 40 by lines 465 such that as piston 450 reciprocates within cylinder 452, movement and the location of piston 450 within cylinder 452 is detected.

Figure 5:
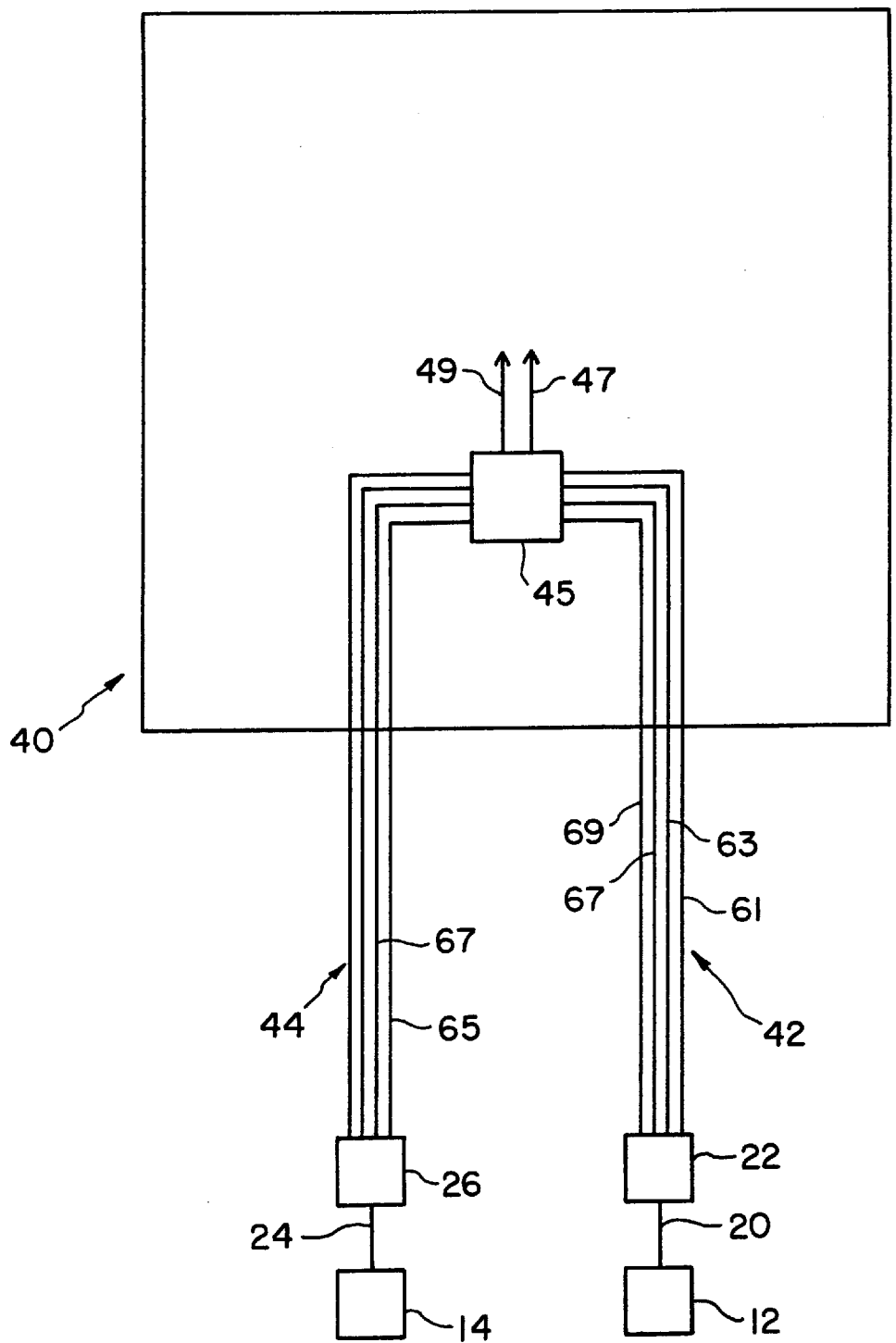
FIG. 5 is a diagrammatic view of the present invention.

Referring to FIG. 5, controller 40 is connected to high and low octane piston meters 22, 26 by lines 42, 44, respectively. Controller 40 comprises volumetric computational means 45 for computing a volume of fuel supplied through the respective high and low octane piston meters 22, 26. High and low octane piston meters 22, 26 sends a high and low octane signal through lines 42, 44, respectively. High octane piston meter 22 will send a high octane signal through lines 61, 63 indicative of a changing inductance or current flow within wire coils 60, 62, respectively. Low octane piston meter 26 will send a low octane signal through lines 65, 67. Controller 40 converts the high and low octane signals to a high and a low volume signal 47, 49 representative of the volume of fuel measured by piston meter 22, 26, respectively.

Controller 40 also controls the flow rate of fuel through piston meters 22, 26. By differentially varying the flow of fluid through high and low piston meters 22, 26, controller 40 is able to select an infinently variable blending of fuel product from the high octane to the low octane rating.

Referring back to FIG. 1, during the operation of this invention, high and low octane fuel is supplied from fuel high and low octane fuel supplies 12, 14, respectively. High and low octane piston meter 22, 26, respectively, measures the volume of fuel supplied and sends a high and low octane signal to controller 40 by lines 42, 44, respectively. The volumetric computational means of controller 40 receives the high and low octane signals and returns a high and low octane volume signal 47, 49 (FIG. 3) representative of the respective total volumes of high and low octane fuel supplied to high and low octane piston meters 22, 26, respectively.

Controller 40 sends a signal to piston meter 22, 26 for varying the flow of high and low octane fuel through high and low octane outlet conduit 28, 30, respectively. By differentially varying the flow of high and low octane fuel through high and low octane outlet conduit 28, 20, an infinently blended fuel between high and low octane fuel is achieved.

High and low octane fuel are blended together through junction conduit 32. The blended fuel exits junction conduit 32 and is dispensed through nozzle 38. Controller 40 also determines a total volume of fluid to be dispensed by summing together the high and low octane volume values together to calculate a total volume dispensed from dispenser 10.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A piston meter, comprising:

a cylinder, said cylinder having an inlet and an outlet;

a piston reciprocatable within said cylinder;

piston sensor for detecting one of location and placement of said piston within said cylinder, said piston sensor detects varying current flow; and volumetric computational means for returning a volume signal as a function of said piston reciprocation within said cylinder.

2. The piston meter of claim 1, further comprising:

an inlet valve in fluid communication with said inlet;

an outlet valve in fluid communication with said outlet;

control means operatively connected to said inlet and outlet values.

3. A dispenser for supplying blended fluid, comprising:

at least one fluid supply line; and a piston meter, comprising:

a cylinder, said cylinder having an inlet and an outlet, said inlet in fluid communication with said at least one fluid supply line;

a piston reciprocatable within said cylinder;

piston sensor for detecting one of location and placement of said piston within said cylinder said piston sensor detects varying current; and volumetric computational means for returning a volume signal as a function of strokes said piston reciprocates within said cylinder.

4. The dispenser of claim 3, wherein said piston meter further comprising:

an inlet valve in fluid communication with said inlet;

an outlet valve in fluid communication with said outlet;

control means operatively connected to said inlet and outlet valves.

5. The dispenser of claim 3, wherein said piston meter produces the blended fluid without a blend valve.

6. The dispenser of claim 3, wherein said piston meter further comprising:

an inlet valve in fluid communication with said inlet;

an outlet valve in fluid communication with said outlet;

said piston sensor detects one of varying inductance and current; and control means operatively connected to said inlet and outlet valves.

7. A method of volumetrically metering fluid to be dispensed, comprising the steps:

supplying fluid to a piston meter having a reciprocatable piston within a cylinder;

determining the location of the piston within the cylinder using an electronic sensor to detect piston movement and placement; and calculating volume of fluid supplied as a function of the piston reciprocation, said electric sensor comprises detecting of one of varying current and inductance.

8. The method of claim 7 wherein the step of determining the location of the piston further comprises using an electronic sensor to detect piston movement and placement.

9. The method of claim 8, wherein the electric sensor comprises detection of one of varying current and inductance.

* * * * *